United States Patent
Nelson et al.

(10) Patent No.: US 10,975,912 B1
(45) Date of Patent: Apr. 13, 2021

(54) ROLLER BEARING CAGE RETENTION APPARATUS

(71) Applicant: United Technologies Corporation, Farmington, CT (US)

(72) Inventors: Alexander Nelson, New Britain, CT (US); Kevin Duffy, Hartford, CT (US)

(73) Assignee: United Technologies Corporation, Farmington, CT (US)

( * ) Notice: Subject to any disclaimer, the term of this patent is extended or adjusted under 35 U.S.C. 154(b) by 0 days.

(21) Appl. No.: 16/785,194

(22) Filed: Feb. 7, 2020

Related U.S. Application Data (60) Provisional application No. 62/963,876, filed on Jan. 21, 2020.

(51) Int. Cl.
*F16C 33/38* (2006.01)
*F16C 33/46* (2006.01)
*F16C 43/06* (2006.01)
*F16C 19/26* (2006.01)

(52) U.S. Cl.
CPC ............ *F16C 33/467* (2013.01); *F16C 19/26* (2013.01); *F16C 43/065* (2013.01)

(58) Field of Classification Search
CPC ...... F16C 19/16; F16C 19/26; F16C 33/3881; F16C 33/3887; F16C 33/4658; F16C 33/467; F16C 43/065; F16C 2360/23
See application file for complete search history.

(56) References Cited

U.S. PATENT DOCUMENTS

| | | | |
|---|---|---|---|
| 1,464,666 A * | 8/1923 | Slater | F16C 19/28 384/579 |
| 2,294,289 A | 8/1942 | Frauenthal | |
| 5,344,239 A | 9/1994 | Stallone et al. | |
| 5,352,047 A | 10/1994 | Ingall et al. | |
| 5,501,533 A | 3/1996 | Williams et al. | |
| 5,816,713 A | 10/1998 | Prock et al. | |
| 6,988,833 B1 | 1/2006 | Docimo | |
| 8,267,650 B2 | 9/2012 | Alam et al. | |
| 8,696,210 B2 | 4/2014 | Kawai et al. | |
| 9,366,293 B2 | 6/2016 | Gessendorfer et al. | |
| 9,458,886 B2 | 10/2016 | Gessendorfer et al. | |
| 9,822,817 B2 * | 11/2017 | Price | F16C 33/3843 |
| 10,458,473 B2 | 10/2019 | Meder et al. | |

(Continued)

FOREIGN PATENT DOCUMENTS

| | | | |
|---|---|---|---|
| DE | 19856024 A1 | 6/2000 | |
| DE | 102013225995 A1 * | 6/2015 | ............ F16C 43/065 |
| DE | 102015214462 A1 * | 2/2017 | ......... F16C 33/4641 |

(Continued)

*Primary Examiner* — Phillip A Johnson
(74) *Attorney, Agent, or Firm* — Kinney & Lange, P.A.

(57) ABSTRACT

A bearing assembly includes a bearing cage and a supplementary ring. The bearing cage includes an annular body and a plurality of bearing elements disposed about the annular body. The supplementary ring includes an annular collar and a plurality of retention elements. The annular collar is disposed concentrically about the bearing cage. The plurality of retention elements is connected to and extends axially from the first annular collar. Each retention element is aligned between adjacent bearing elements. The plurality of retention elements is disposed to retain the plurality of bearing elements in the annular body of the bearing cage.

16 Claims, 4 Drawing Sheets

(56) References Cited

U.S. PATENT DOCUMENTS

2012/0167391 A1     7/2012  Werner
2019/0048743 A1     2/2019  Tulej

FOREIGN PATENT DOCUMENTS

| EP | 2664808 A2 | | 11/2013 | |
|---|---|---|---|---|
| JP | 2009144795 A | | 7/2009 | |
| JP | 2010151211 A | | 7/2010 | |
| JP | 6005068 B2 | | 10/2016 | |
| WO | WO-2010150707 A1 | * | 12/2010 | ............ F16C 33/585 |

* cited by examiner

ROLLER BEARING CAGE RETENTION APPARATUS

CROSS-REFERENCE TO RELATED APPLICATION(S)

This application claims the benefit of U.S. Provisional Application No. 62/963,876, filed Jan. 21, 2020 for "ROLLER BEARING CAGE RETENTION APPARATUS" by A. Nelson and K. Duffy.

BACKGROUND

The present disclosure relates to bearing assemblies in aircraft engines. More particularly, the present disclosure relates to retention of bearing elements in a bearing cage of an aircraft.

In aircraft engines, bearing cages act to separate bearing elements such as roller bearings. Gas turbine engine bearing cages are typically piloted on the inner or outer ring of the bearing element(s). The bearing cage then rotates with the bearing elements of the bearing cage. Existing bearing cages incorporate a plastically formed detent feature in order to retain the bearing elements in the bearing cage. Such plastic deformation can cause residual stresses leading to potential fracture of the bearing cage during operation. Likewise, fully machined bearing cages can have problems with dropping of the bearing elements, which can make the installation of an inner assembly onto an outer ring challenging.

SUMMARY

A bearing assembly includes a bearing cage and a supplementary ring. The bearing cage includes an annular body and a plurality of bearing elements disposed about the annular body. The supplementary ring includes an annular collar and a plurality of retention elements. The annular collar is disposed concentrically about the bearing cage. The plurality of retention elements is connected to and extends axially from the first annular collar. Each retention element is aligned between adjacent bearing elements. The plurality of retention elements is disposed to retain the plurality of bearing elements in the annular body of the bearing cage.

A method of assembling a bearing assembly includes positioning a bearing cage to receive a plurality of bearing elements. The bearing cage includes an annular body with a plurality of slots and a plurality of bearing elements disposed in the plurality of slots. The plurality of bearing elements are inserted into slots of the bearing cage. A first supplementary ring is slid onto the bearing cage. The first supplementary ring includes a first annular collar disposed concentrically about the bearing cage and a first plurality of retention elements connected to and extending axially from the first annular collar. The plurality of bearing elements is retained in the slots of the bearing cage with the first plurality of retention elements.

The present summary is provided only by way of example, and not limitation. Other aspects of the present disclosure will be appreciated in view of the entirety of the present disclosure, including the entire text, claims, and accompanying figures.

While the above-identified figures set forth one or more embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

The proposed disclosure presents a supplementary ring (or rings) with axially extending fingers mounted onto the roller bearing cage with the fingers acting to radially retain the roller bearing elements and to provide compressive support against the bearing race.

Figure 1A:
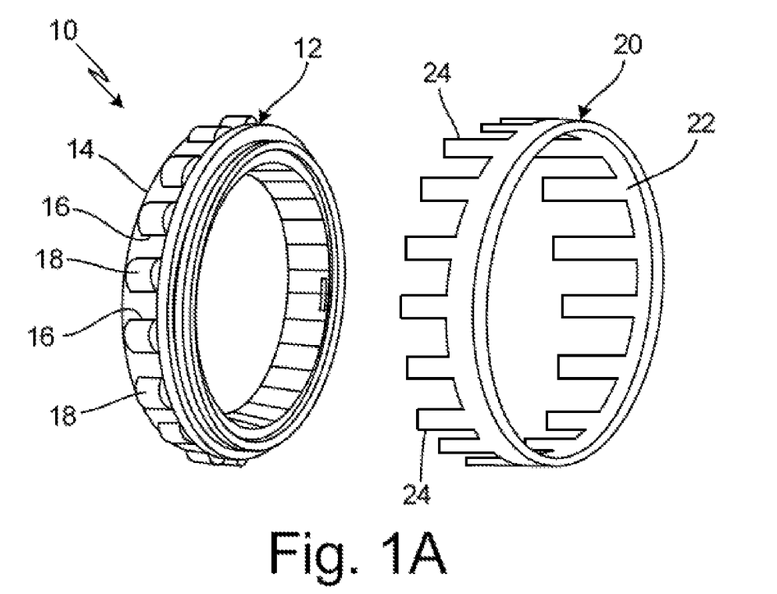
FIG. 1A is a perspective exploded view of a roller bearing cage and a first supplementary ring.

FIG. 1A is a perspective exploded view of bearing assembly 10 and shows bearing cage 12 (with annular body 14 and slots 16), bearing elements 18, and first supplementary ring 20 (with first annular collar 22 and first retention elements 24).

Bearing assembly 10 is an assembly of bearing components (e.g., a bearing inner race assembly) for use in an aircraft such as a gas turbine engine. Although not shown in FIG. 1, bearing assembly 10 can also include an outer race. Bearing cage 12 is an inner race of bearing assembly 10. Annular body 14 is a ring or hollow cylinder of solid material. In one example, annular body 14 can include a single ring. In other examples, annular body 14 can include more than one radially situated rings. Slots 16 are openings or holes. In this example, slots 16 are evenly spaced about annular body 14. Bearing elements 18 are rolling elements of a bearing. In this example, bearing elements 18 are roller bearing elements. In another non-limiting embodiment (see e.g., FIG. 4), bearing elements 18 can include ball bearing elements. First supplementary ring 20 is a retention and support element. In this exploded view, first supplementary ring 20 is shown as detached from bearing cage 12. First annular collar 22 is a ring or hollow cylinder of solid material. First retention elements 24 are extensions or fingers of solid material.

In FIG. 1A, bearing cage 12 is in axial alignment with first supplementary ring 20. In this example, this position occurs just before a step of sliding bearing cage 12 and first supplementary ring 20 together. Annular body 14 is positioned parallel to first annular collar 22 of first supplementary ring 20. In this example, annular body 14 includes an outer diameter that is slightly less than an inner diameter of first annular collar 22. Slots 16 are disposed in annular body 14. In this example, slots 16 are evenly spaced along a circumference of annular body 14. Slots cut into annular body 14 such that slots 16 open up into portions of annular body 14. Bearing elements 18 are mounted into slots 16. For example, each of bearing elements 18 is mounted in a single slot 16. In this example, bearing elements 18 are evenly spaced from each other. In this example, first supplementary ring 20 is positioned away from bearing cage 12, such as in an alignment step prior to engaging first supplementary ring 20 with bearing cage 12. First annular collar 22 is positioned parallel to annular body 14 of bearing cage 12. First retention elements 24 are connected to and extend axially from first annular collar 22.

Bearing cage 12 facilitates relative rotation between a first component and a second component in a gas turbine engine. Annular body 14 and slots 16 maintain circumferentially symmetric spacing between bearing elements 18. Bearing elements 18 enable relative rotation between a radially inner element and a radially outer element. In this example, bearing elements 18 can provide relative rotation between a low or high speed shaft and a bearing housing within an aircraft.

Figure 1B:
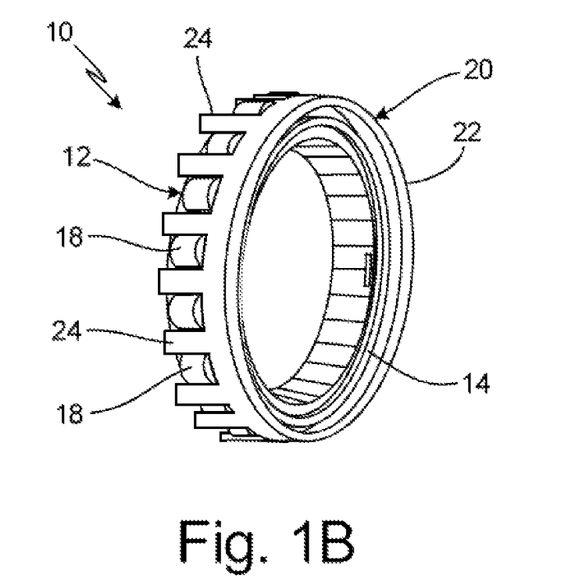
FIG. 1B is a perspective view of the first supplementary ring shown attached to the roller bearing cage.

FIG. 1B is a perspective view of bearing assembly 10 and shows bearing cage 12 (with annular body 14), bearing elements 18, and first supplementary ring 20 (with first annular collar 22 and first retention elements 24). Here, first supplementary ring 20 is shown as engaged with bearing cage 12.

FIG. 1B displays how first retention elements 24 interact with and fit between bearing elements 18. For example, as first supplementary ring 20 engages with bearing cage 12, first retention elements 24 move in an axial direction and such that each one of first retention elements 24 slides axially between two circumferentially adjacent bearing elements 18. In this way, an alternating pattern is formed along a circumferential direction that follows the pattern of bearing element 18, first retention element 24, bearing element 18, first retention element 24, . . . etc. In the configuration shown in FIG. 1B, first retention elements 24 are in contact with an outer radial surface of annular body 14 of bearing cage 12.

First supplementary ring 20 surrounds both of annular body 14 and bearing elements 18. By surrounding bearing elements 18, first supplementary ring 20 retains bearing elements 18 by containing bearing elements in slots 16 and preventing bearing elements 18 from becoming dislodged from slots 16. For example, first retention elements 24 retain bearing elements 18 in slots 16 by each of first retention elements 24 including a circumferential width that is greater than a gap between adjacent bearing elements 18. Due to this, as bearing elements 18 move radially outward, the gap between adjacent first retention elements 24 being smaller than the width of bearing elements 18, bearing elements 18 would come into contact with portions of adjacent first retentions elements 24 and be blocked from continuing to move radially outward.

First annular collar 22 supports first retention elements 24 by holding first retentions elements 24 along an axial direction. For example, as first retention elements 24 are pushed radially outward (via e.g., bearing elements 18 or during installation first supplementary ring 20 onto bearing cage 12), first annular collar 22 provides an opposite force to first retention elements 24 in order to push first retention elements 24 back radially inward.

With the incorporation of first supplementary ring 20 in bearing assembly 10, if a fracture or crack in a side rail or a cross bar of bearing cage 12 occurs, first supplementary ring 20 keeps bearing cage 12 together during such a fracture. First supplementary ring 20 also adds compressive force to the sides and cross bars of bearing cage 12. Additionally, compared to existing bearing assemblies, the amount of time to manufacture bearing assembly 10 is decreased because no additional structural modifications need to be made to annular body 14 in order to create a physical barrier preventing bearing elements 18 from exiting slots 16. For example, the labor hours to machine first supplementary ring 20, and the tolerance(s) of first supplementary ring 20 will make a less-expensive product in both reducing the machining time and the tolerance(s) needed to manufacture first supplementary ring 20.

Figure 2A:
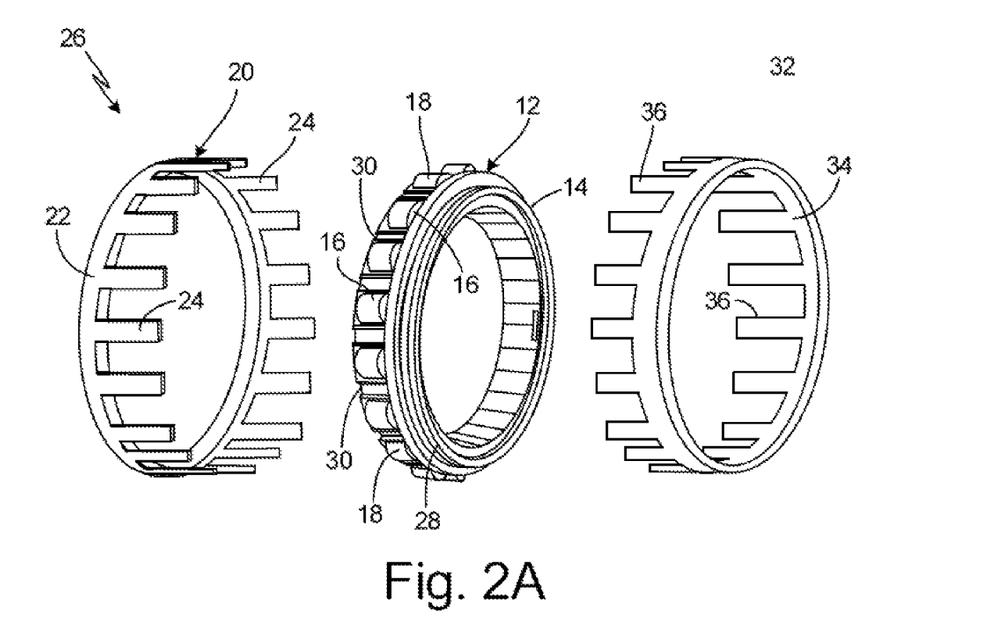
FIG. 2A is a perspective exploded view of an alternative roller bearing cage, the first supplementary ring, and a second supplementary ring.

FIG. 2A is a perspective exploded view of bearing assembly 26 and shows bearing cage 12 (with annular body 14, slots 16, circumferential notch 28, and axial channels 30), bearing elements 18, first supplementary ring 20 (with first annular collar 22 and first retention elements 24), and second supplementary ring 32 (with second annular collar 34 and second retention elements 36).

In this alternate embodiment, bearing cage 12 is shown to include circumferential notch 28 and axial channels 30. Circumferential notch 28 is a notch or channel cut into an axial end of annular body 14 of bearing cage 12. In this example, a single circumferential notch 28 is shown in annular body 14. In another non-limiting embodiment, a second circumferential notch can be disposed in the opposite axial end of annular body 14. Axial channels 30 are notches or channels cut into an outer radial surface of annular body 14. Each of axial channels 30 are disposed circumferentially between adjacent slots 16. In this example, axial channels 30 are dispersed along an entire circumference of annular body 14. Second supplementary ring 32 is a retention and support element. In this exploded view, second supplementary ring 32 is shown as detached from bearing cage 12. In one non-limiting embodiment, first supplementary ring 20 and/ or second supplementary ring 32 can include a coating (e.g., silver plating). Second annular collar 34 is a ring or hollow cylinder of solid material. Second retention elements 36 are extensions or fingers of solid material.

In the view shown in FIG. 2A, bearing cage 12, first supplementary ring 20, and second supplementary ring 32 are shown in a disassembled state. In this view, first retention elements 24 and second retention elements 36 are aligned in an axial direction with axial channels 30 of bearing cage 12. In this example, axial channels 30 form receiving slots for first retention elements 24 and second retention elements 36 to slide into.

Figure 2B:
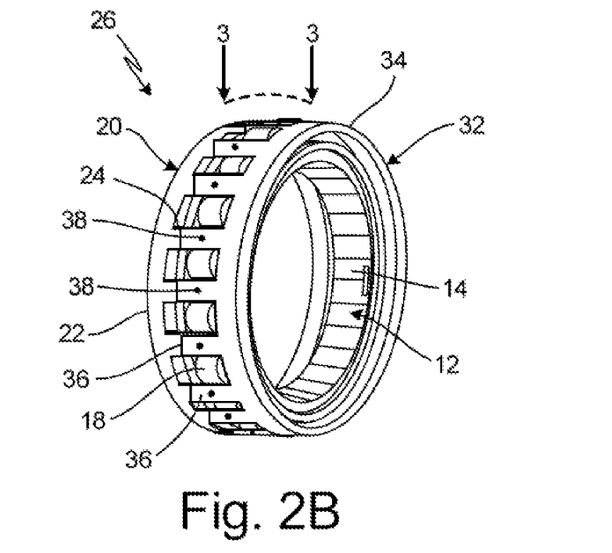
FIG. 2B is a perspective view of the alternate first and second supplementary rings attached together and enclosing the roller bearing cage.

FIG. 2B is a perspective view bearing assembly 26 and shows bearing cage 12 (with annular body 14), bearing elements 18, first supplementary ring 20 (with first annular collar 22 and first retention elements 24), second supplementary ring 32 (with second annular collar 34 and second retention elements 36), and attachment locations 38. Here, first supplementary ring 20 and second supplementary ring 32 are shown as engaged with and mounted onto bearing cage 12.

Attachment locations 38 are locations along bearing assembly 26 where first supplementary ring 20 and second supplementary ring 32 are attached to one another. Attachment locations 38 can be either permanent or non-permanent fixation points. In this example, attachment locations 38 can be a rivet. In another non-limiting embodiment, attachment locations 38 can be a location of a weld. In this example, each of first retention elements 24 and each of second retention elements 36 are positioned between adjacent bearing elements 18 of bearing cage 12. Each of first retention elements 24 and each of second retention elements 36 are also disposed in axial channels 30. As shown in FIG. 2B, second annular collar 34 is disposed to occupy circumferential notch 28. In one non-limiting embodiment, first annular collar 22 can be disposed in another circumferential notch disposed on an opposite end of annular body 14 from circumferential notch 28. In another non-limiting embodiment, attachment locations 38 can be located such that attachment locations are disposed through annular body 14.

First supplementary ring 20 and second supplementary ring 32 are attached to bearing cage 12 after bearing elements 18 are installed into slots 16. In one example, first supplementary ring 20 is mounted onto bearing cage 12 before second supplementary ring 32. Once first supplementary ring 20 is positioned on bearing cage 12, second supplementary ring 32 is mounted onto bearing cage 12 such that second retention elements 36 overlay first retention elements 24. Together with first supplementary ring 20, second supplementary ring 32 also adds compressive force to the sides and cross bars of bearing cage 12. In one non-limiting embodiment, first supplementary ring 20 and/or second supplementary ring 32 can be removed from bearing cage 12 after installation of bearing assembly 10 into the aircraft. In another non-limiting embodiment, first supplementary ring 20 and/or second supplementary ring 32 can remain attached to bearing cage 12 during operation of the aircraft.

Second retention elements 36 of second supplementary ring 32 reduce the circumference lift of first retention elements 24 on the first supplementary ring 20 by pushing against first retention elements 24 as first retention elements 24 push radially outward. Second retention elements 36 also retain bearing elements 18 into annular body 14 of bearing cage 12 in the same manner as first retention elements 24 of first supplementary ring 20.

First supplementary ring 20 and second supplementary ring 32 add durability to bearing cage 12 by adding a constant compressive force, from the press-fit of first supplementary ring 20 and second supplementary ring 32 on bearing cage 12. For example, just as peening adds a subsurface layer of compressive stress to increase the robustness of a part, a similar benefit is provided with first supplementary ring 20 and second supplementary ring 32 as first supplementary ring 20 and second supplementary ring 32 compresses bearing cage 12. In an instance of a fracture of bearing cage 12, first supplementary ring 20 and second supplementary ring 32 will hit and run on an inner diameter of an outer race further minimizing damage to bearing assembly 10.

In an example with first supplementary ring 20 and/or second supplementary ring 32 including a coating (e.g., silver plating), during a fracture of bearing cage 12, first supplementary ring 20 and second supplementary ring 32 act as bumpers, riding on the inner diameter of the outer race to keep bearing assembly 10 generally aligned and to minimize damage to other shaft components and turbomachinery.

Figure 3A:
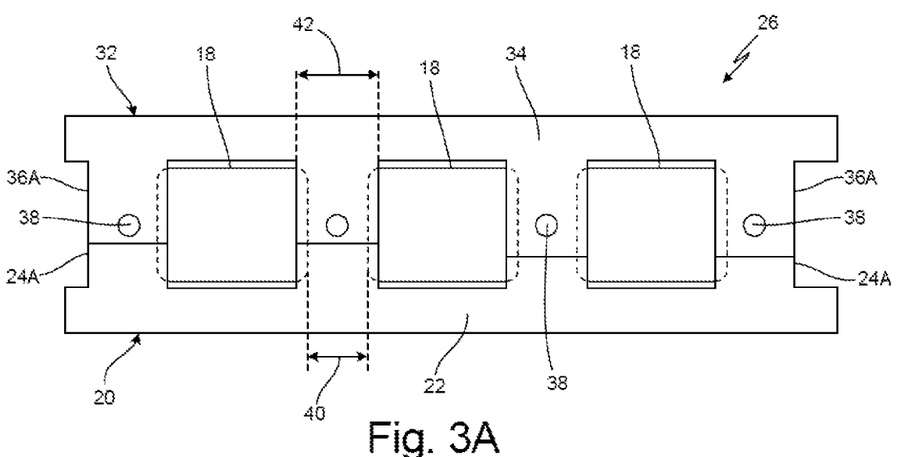
FIG. 3A is a top view taken along 3-3 in FIG. 2B of a portion of the first and second supplementary rings attached together and enclosing the roller bearing cage.

FIG. 3A is a top view of bearing assembly 26 taken along 3-3 in FIG. 2B and shows bearing elements 18, first supplementary ring 20, first annular collar 22, first retention elements 24A, second supplementary ring 32, second annular collar 34, second retention elements 36A, attachment locations 38, gap 40, and width 42.

Gap 40 is a gap formed between adjacent bearing elements 18. In this example, gap 40 is uniform throughout an entire circumference of annular body 14. Width 42 is a width in the circumferential direction (e.g., depicted as side-to-side in FIG. 3A) of one of first retention elements 24A. In this example, width 42 is also representative of a circumferential width of second retention elements 36A. In other non-limiting embodiments, a width of second retention elements 36A can be greater than or less than width 42 of first retention elements 24A.

As described above, first retention elements 24A and second retention elements 36A lay over or on top of portions of bearing elements 18. For example, as shown in FIG. 3A, edges of first retention elements 24A and second retention elements 36A overlap or cover edges of bearing elements 18 in a radial direction (e.g., into and out of the page in FIG. 3A). Due to this overlap, as bearing elements 18 are drawn radially outward due to gravity or centrifugal forces during transportation, assembly, or operation, first retention elements 24A and second retention elements 36A arrest the radially outward motion of bearing elements 18 and thus retain bearing elements in slots 16 of annular body 14.

Due to this, compared to existing bearing assemblies, the amount of time to manufacture bearing assemblies 10 and 26 is decreased because no additional structural modifications need to be made to annular body 14 in order to create a physical barrier preventing bearing elements 18 from exiting slots 16.

Figure 3B:
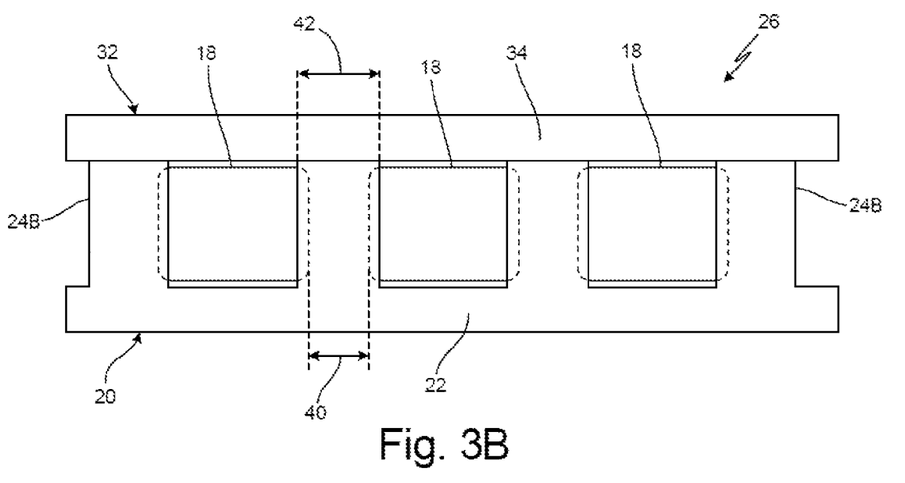
FIG. 3B is a top view taken of a portion of other first and second supplementary rings attached together and enclosing the roller bearing cage.

FIG. 3B is a top view of bearing assembly 26 and shows bearing elements 18, first supplementary ring 20, first annular collar 22, first retention elements 24B, second supplementary ring 32, second annular collar 34, gap 40, and width 42.

In the non-limiting embodiment shown in FIG. 3B, first annular collar 22 is shown to include first retention elements 24B that extend axially over to second annular collar 34, with second annular collar 34 not including any second retention elements. Here, first retention elements 24B connect to second annular collar 34 with an overlapping joint so as to radially retain (e.g., prevent/limit radial displacement of) distal ends of first retention elements 24B and/or second annular collar 34. In this example, the overlapping joints replace the need for attachment locations such as shown in FIG. 3A.

Figure 4:
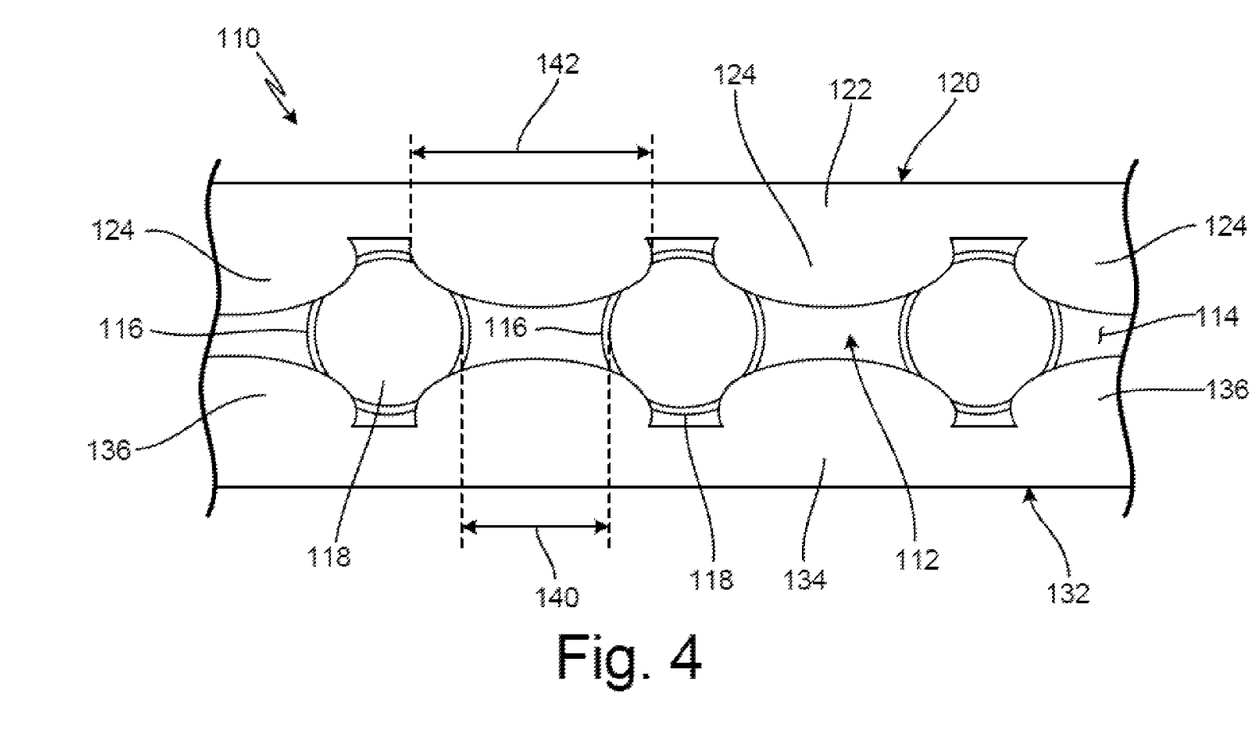
FIG. 4 is a top view of a portion of a ball bearing cage and a third supplementary ring.

FIG. 4 is a top view of a portion of bearing assembly 110 and shows bearing cage 112 (with annular body 114, slots 116, and bearing elements 118), first supplementary ring 120 (with first annular collar 122 and first retention elements 124), and second supplementary ring 132 (with second annular collar 134 and second retention elements 136).

Here, bearing elements 118 include ball bearing elements. Likewise, slots 116 include circular shaped slots to correspond to the circular shapes of bearing elements 118. In this example, first retention elements 124 and second retention elements 136 include elliptical shaped fingers of solid material. As with first retention elements 24A and second retention elements 36A in FIG. 3A, first retention elements 124 and second retention elements 136 lay over or on top of portions of bearing elements 118. For example, as shown in FIG. 4, edges of first retention elements 124 and second retention elements 136 overlap or cover edges of bearing elements 118 in a radial direction (e.g., into and out of the page in FIG. 4). Due to this overlap, as bearing elements 118 are drawn radially outward due to gravity or centrifugal forces during transportation, assembly, or operation, first retention elements 124 and second retention elements 136 arrest the radially outward motion of bearing elements 118 and thus retain bearing elements in slots 116 of annular body 114.

Discussion of Possible Embodiments

A bearing assembly includes a bearing cage and a supplementary ring. The bearing cage includes an annular body and a plurality of bearing elements disposed about the annular body. The supplementary ring includes an annular collar and a plurality of retention elements. The annular collar is disposed concentrically about the bearing cage. The plurality of retention elements is connected to and extends axially from the first annular collar. Each retention element is aligned between adjacent bearing elements. The plurality of retention elements is disposed to retain the plurality of bearing elements in the annular body of the bearing cage.

The bearing assembly of the preceding paragraph can optionally include, additionally and/or alternatively, any one or more of the following features, configurations and/or additional components.

The plurality of bearing elements can form a gap between adjacent bearing elements of the plurality of bearing elements, wherein each retention element of the first plurality of retention elements can include a first width in a circumferential direction of the first annular collar, wherein the first width of each retention element of the first plurality of retention elements can be greater than the gap between adjacent bearing elements of the plurality of bearing elements.

The bearing elements can comprise roller bearings.

The retention elements of the supplementary ring can be configured to radially compress the bearing cage.

The bearing elements can comprise ball bearings.

Each of the retention elements can comprise an elliptical shape.

A second supplementary ring can include a second annular collar mounted onto the annular body of the bearing cage, and/or a second plurality of retention elements connected to and extending axially from the second annular collar, wherein each retention element of the second plurality of retention elements can be aligned between consecutive bearing elements, wherein the second plurality of retentions elements can be disposed to retain the plurality of bearing elements in the annular body of the bearing cage.

The second plurality of retention elements can be attached to the first plurality of retention elements.

A method of assembling a bearing assembly includes positioning a bearing cage to receive a plurality of bearing elements. The bearing cage includes an annular body with a plurality of slots and a plurality of bearing elements disposed in the plurality of slots. The plurality of bearing elements are inserted into slots of the bearing cage. A first supplementary ring is slid onto the bearing cage. The first supplementary ring includes a first annular collar disposed concentrically about the bearing cage and a first plurality of retention elements connected to and extending axially from the first annular collar. The plurality of bearing elements is retained in the slots of the bearing cage with the first plurality of retention elements.

The method of the preceding paragraph can optionally include, additionally and/or alternatively, any one or more of the following steps, features, configurations and/or additional components.

The first plurality of retention elements can be positioned such that each retention element of the first plurality of retention elements can be disposed between adjacent bearing elements of the plurality of bearing elements.

The plurality of bearing elements can form a gap between adjacent bearing elements of the plurality of bearing elements, wherein each retention element of the first plurality of retention elements can include a first width in a circumferential direction of the first annular collar, wherein the first width of each retention element of the first plurality of retention elements can be greater than the gap between adjacent bearing elements of the plurality of bearing elements.

The bearing cage can be radially compressed with the first supplementary ring.

The first supplementary ring can be press-fit onto the annular body of the bearing cage.

A second supplementary ring can be slid onto the bearing cage.

The second supplementary ring can be affixed to the first supplementary ring.

The bearing assembly can be installed into a bearing compartment of an aircraft.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A bearing assembly comprising:
   a bearing cage comprising:
      an annular body; and
      a plurality of bearing elements disposed about the annular body; and
   a first supplementary ring comprising:
      a first annular collar disposed concentrically about the bearing cage; and
      a first plurality of retention elements connected to and extending axially from the first annular collar, wherein each retention element of the first plurality of retention elements is aligned between adjacent bearing elements of the plurality of bearing elements, wherein the first plurality of retention elements is disposed to retain the plurality of bearing elements in the annular body of the bearing cage.

2. The bearing assembly of claim 1, wherein the plurality of bearing elements form a gap between adjacent bearing elements of the plurality of bearing elements, wherein each retention element of the first plurality of retention elements includes a first width in a circumferential direction of the first annular collar, wherein the first width of each retention element of the first plurality of retention elements is greater than the gap between adjacent bearing elements of the plurality of bearing elements.

3. The bearing assembly of claim 1, wherein the bearing elements comprise roller bearings.

4. The bearing assembly of claim 1, wherein the retention elements of the first supplementary ring are configured to radially compress the bearing cage.

5. The bearing assembly of claim 1, wherein the bearing elements comprise ball bearings.

6. The bearing assembly of claim 5, wherein each of the retention elements comprise an elliptical shape.

7. The bearing assembly of claim 1, further comprising a second supplementary ring comprising:
   a second annular collar mounted onto the annular body of the bearing cage; and
   a second plurality of retention elements connected to and extending axially from the second annular collar, wherein each retention element of the second plurality of retention elements is aligned between consecutive bearing elements, wherein the second plurality of retentions elements is disposed to retain the plurality of bearing elements in the annular body of the bearing cage.

8. The bearing assembly of claim 7, wherein the second plurality of retention elements is attached to the first plurality of retention elements.

9. A method of assembling a bearing assembly, the method comprising:
   positioning a bearing cage to receive a plurality of bearing elements, wherein the bearing cage comprises:
      an annular body with a plurality of slots formed therein; and
      a plurality of bearing elements disposed about the annular body and in the plurality of slots;
   inserting the plurality of bearing elements into slots of the bearing cage;
   sliding a first supplementary ring onto the bearing cage, wherein the first supplementary ring comprises:
      a first annular collar disposed concentrically about the bearing cage; and
      a first plurality of retention elements connected to and extending axially from the first annular collar; and
   retaining, with the first plurality of retention elements, the plurality of bearing elements in the slots of the bearing cage.

10. The method of claim 9, further comprising positioning the first plurality of retention elements such that each retention element of the first plurality of retention elements is disposed between adjacent bearing elements of the plurality of bearing elements.

11. The method of claim 10, wherein the plurality of bearing elements form a gap between adjacent bearing elements of the plurality of bearing elements, wherein each retention element of the first plurality of retention elements includes a first width in a circumferential direction of the first annular collar, wherein the first width of each retention element of the first plurality of retention elements is greater than the gap between adjacent bearing elements of the plurality of bearing elements.

12. The method of claim 9, further comprising radially compressing the bearing cage with the first supplementary ring.

13. The method of claim 9, wherein sliding the first supplementary ring onto the bearing cage comprises press-fitting the first supplementary ring onto the annular body of the bearing cage.

14. The method of claim 9, further comprising sliding a second supplementary ring onto the bearing cage.

15. The method of claim 14, further comprising affixing the second supplementary ring to the first supplementary ring.

16. The method of claim 9, further comprising installing the bearing assembly into a bearing compartment of an aircraft.

* * * * *